United States Patent [19]

Hodlewsky

[11] Patent Number: 4,858,753
[45] Date of Patent: Aug. 22, 1989

[54] CONVEYOR CHAIN ASSEMBLY
[75] Inventor: William G. Hodlewsky, Greendale, Wis.
[73] Assignee: Rexnord Corporation, Milwaukee, Wis.
[21] Appl. No.: 206,591
[22] Filed: Jun. 14, 1988

Related U.S. Application Data
[63] Continuation-in-part of Ser. No. 38,845, Apr. 15, 1987.
[51] Int. Cl.⁴ .............................................. B65G 17/06
[52] U.S. Cl. .................................................... 198/853
[58] Field of Search ............................... 198/853, 858

[56] References Cited
U.S. PATENT DOCUMENTS

| | | | |
|---|---|---|---|
| Re. 30,341 | 7/1980 | Lapeyre | 198/834 |
| 2,363,932 | 11/1944 | Beers | 198/853 X |
| 2,852,129 | 9/1958 | Conner | 198/853 |
| 3,726,569 | 4/1973 | Maglio et al. | 198/853 X |
| 3,785,476 | 1/1974 | Poertink | 198/853 |
| 3,854,575 | 12/1974 | Fraioli, Sr. | 198/853 X |
| 3,870,141 | 3/1975 | Lapeyre et al. | 198/193 |
| 4,004,682 | 1/1977 | Schuler | 198/853 X |
| 4,051,949 | 10/1977 | Lapeyre | 198/853 |
| 4,138,011 | 2/1979 | Lapeyre | 198/853 X |
| 4,159,763 | 7/1979 | Kewley et al. | 198/853 |
| 4,276,980 | 7/1981 | Oizumi | 198/853 X |
| 4,688,670 | 8/1987 | Lapeyre | 198/853 |
| 4,709,807 | 12/1987 | Poerink | 198/853 |

FOREIGN PATENT DOCUMENTS

0066530 12/1988 European Pat. Off. ............ 198/853
2144290 8/1971 Fed. Rep. of Germany ...... 198/853

Primary Examiner—Robert J. Spar
Assistant Examiner—James R. Bidwell
Attorney, Agent, or Firm—Michael, Best & Friedrich

[57] ABSTRACT

A chain module for use in forming a conveyor chain assembly, the chain module having a plurality of link ends being adapted to intermesh with link ends of an adjacent module, the link ends have aligned slots adapted to house a hinge pin for pivotally joining together adjacent modules. The chain module also has a link end having a generally circular aperture, the generally circular aperture being aligned with the ends of the slots adjacent the body of the module and such that the hinge pin is out of alignment with the circular hole during operation of the conveyor chain.

2 Claims, 6 Drawing Sheets

CONVEYOR CHAIN ASSEMBLY

This application is a continuation-in-part of U.S. patent application Ser. No. 038,845, filed Apr. 15, 1987 pending.

FIELD OF THE INVENTION

This invention relates to conveyor assemblies which are made up of a multiplicity of pivotally interconnected rectangular chain modules.

BACKGROUND OF THE INVENTION

Prior art modular conveyor chains include rows of chain modules, each module having a plurality of spaced link ends which intermesh with the complementary link ends projecting from a module in an adjacent row. A pivot pin runs through the interengaged or meshing link ends to permit pivotal movement of the modules with respect to each other. Typically the pivot pin projects from each edge or side of the conveyor chain and is provided with a head which prevents the pin from moving transversely of the conveyor. The head on one end of the hinge pin can be preformed, but in most cases the heads are formed by heat and pressure after the pin has been placed in position. The heads project from the sides of the conveyor chain and can catch or drag on adjacent structures and require additional lateral clearance between the conveyor and the conveyor guide or between adjacent conveyor chains.

The prior art conveyors generally have modules of similar width engaging one another. This can result in forces being set up tending to separate laterally adjacent modules.

Examples of prior art chains are illustrated in Lapeyre, et al. U.S. Pat. No. 3,870,141, issued Mar. 11, 1975; the Lapeyre U.S. Pat. No. 4,051,949, issued Oct. 4, 1977; the Lapeyre U.S. Pat. No. Re. 30,341, issued July 22, 1980; and the Kewley, et al. U.S. Pat. No. 4,159,763, issued July 3, 1979.

SUMMARY OF THE INVENTION

The present invention provides a conveyor chain formed of a plurality of chain modules wherein the modules are constructed such that hinge pins are easily inserted between modules and the hinge pins are securely held in place without forming heads on the hinge pin after insertion.

More specifically, the invention includes a chain module for use in forming a conveyor chain assembly, the chain module having a body portion and a plurality of link ends projecting forwardly and rearwardly from the module body portion with respect to the direction of movement of the conveyor chain, the link ends being adapted to intermesh with link ends of an adjacent module. At least a plurality of the link ends include substantially coaxially aligned holes adapted to house a hinge pin for pivotally joining together adjacent modules. These holes in the link ends comprises slots extending in the direction of movement of the conveyor chain. One of the link ends adjacent one end of the body portion includes a generally circular aperture aligned with the end of the slots adjacent the module body portion, whereby when a pair of modules are placed together with links in intermeshing relation, a hinge pin can be inserted through the hole to hingedly join two modules, and whereby when the conveyor chain is placed in tension, the hinge pin moves out of alignment with the circular hole in the end link thereby preventing the hinge pin from movement out of the link ends.

One of the advantages of the modular chain assembly embodying the invention is that when the conveyor chain is under tension the hinge pins joining the modules are in a position out of alignment with the hole in the module link at the edge of the conveyor. This prevents movement of the hinge pin out of the joint. The provision of elongated slots for housing the hinge pins also facilitates cleaning of the conveyor chain assembly because the slots permit entry of cleaning solution into the joint area and around the hinge pin.

The invention is not limited to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

BRIEF DESCRIPTION OF THE DRAWINGS

FIG. 21 is an exploded partial perspective view of another chain assembly embodying the invention.

FIG. 22 is an enlarged perspective view of a portion of the chain assembly shown in FIG. 21.

DETAILED DESCRIPTION OF THE DRAWINGS

Figure 1:
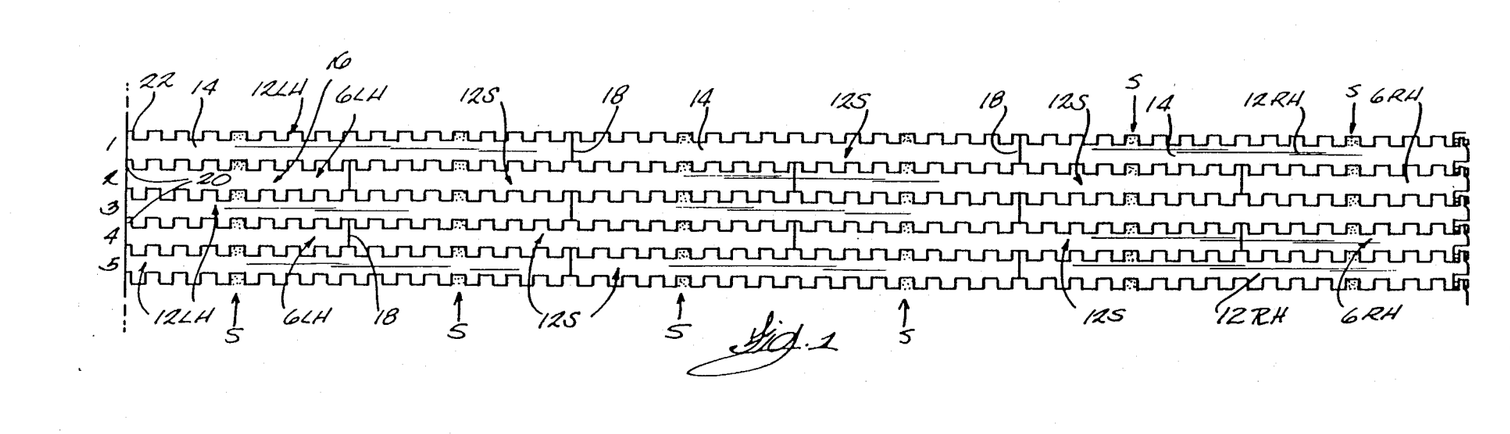
FIG. 1 is a plan view showing a bricked assembly of a conveyor according to this invention.

FIG. 1 shows a plan view of a portion of a 36" wide conveyor chain comprised of a plurality of links or chain modules 14 and assembled with the modular components "bricked". Thus, starting at the top of FIG. 1, the first row of chain modules 14 is made up of three 12" wide modules. In this first row, the left-hand edge module 14 is designated 12LH; that is, a 12" wide module for the left-hand edge of the conveyor. The significance of the edges will become more apparent hereafter. The middle link or chain module is referred to as 12S, (S for standard), and the right-hand edge module is referred to as 12RH. The next row of chain modules is made up of a 6" module 16 which is designated 6LH. Then, to the right is a 12"wide module 14 12S. The next module 14 to the right is also a 12S while the module on the far right of the second row is a 6RH. It will be understood that the 6"module on each end is necessary to separate the joints in a brick-like lay-up. Thus, in the first row there are two joints 18, while in the second row there are three joints.

In the third row, the module arrangement is the same as the first. That is, there is a 12LH, a 12S and a 12RH. The fourth row is like the second row, that is a 6LH, two 12S and a 6RH. The fifth row is like rows 1 and 3, i.e. 12LH, 12S and 12RH.

Figure 6:
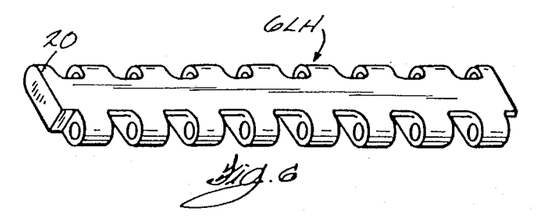
FIG. 6 is a perspective view of a 6 inch wide left side module employed in the conveyor shown in FIGS. 1-5.
Figure 7:
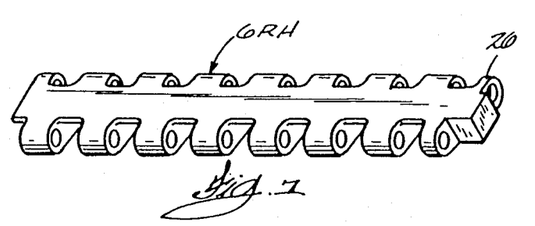
FIG. 7 is a perspective view of a 6 inch wide right side module employed in the conveyor shown in FIGS. 1-5.
Figure 8:
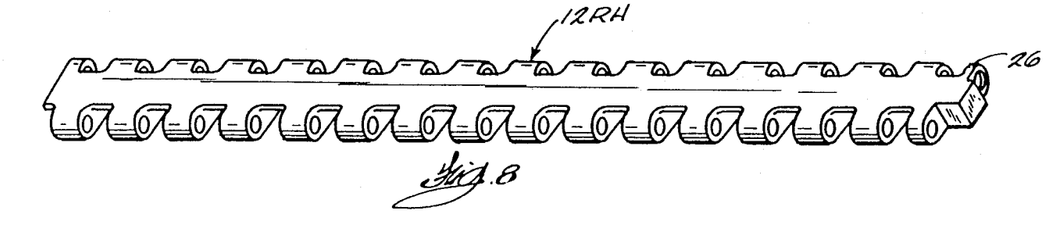
FIG. 8 is a perspective view of a 12 inch wide right side module employed in the conveyor shown in FIGS. 1-5.
Figure 9:
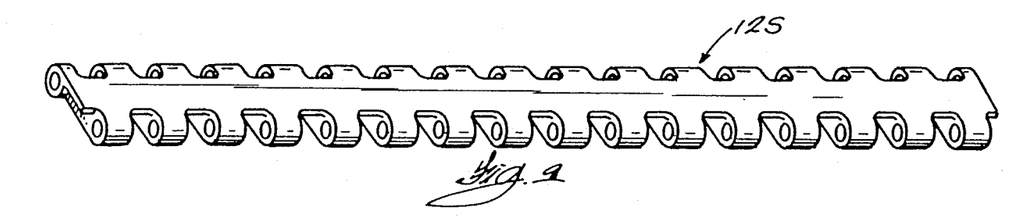
FIG. 9 is a perspective view of a 12 inch wide standard or middle module employed in the conveyor shown in FIGS. 1-5.
Figure 10:
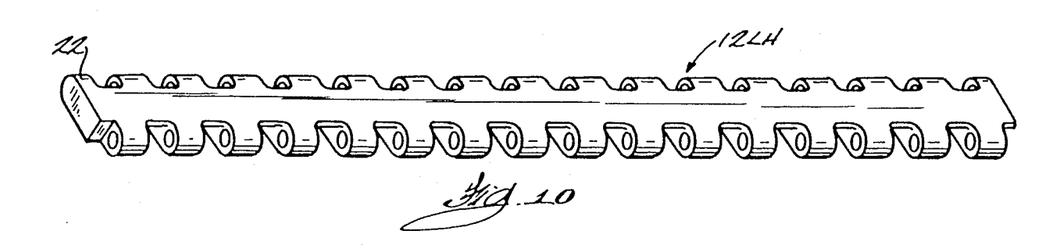
FIG. 10 is a perspective view of a left side 12 inch wide module employed in the conveyor shown in FIGS. 1-5.

It will be appreciated from the above description that the conveyor chain is made up of five different kinds of chain modules, and these are illustrated more particularly in FIGS. 6, 7, 8, 9 and 10. FIG. 6 shows a module 6LH, while FIG. 7 shows a 6RH module. FIG. 8 illustrates a 12RH module. FIG. 9 shows a 12S module and FIG. 10 shows a 12LH module. Assembling the modules in the bricked arrangement necessitates two different sizes by way of width (width being measured relative to the width of the conveyor chain, not the width of the module). It will be noted that all the left-hand edge modules have a blind link end or eye adjacent the left edge or side of the conveyor chain. Thus, in the 6LH module shown in FIG. 6 the blind link end is designated 20, and in FIG. 10 the blind link end is designated 22. The modules are interconnected by means of a hinge pin or pivot pin 24 inserted from the right-hand side of the conveyor chain and running through the aligned bores or apertures of the meshing or interengaged link ends to abut the blind link end 20 or 22 as the case may be.

It will be noted that the pivot pin 24 must pass through the central bore or aperture of a plugged link end or eye 26 at the right edge of module 6RH or 12RH. This plugged link end has a central aperture big enough to easily receive the pivot pin 24 which is cut to length to abut the blind eye 20 on the left side of the 6LH module or the blind eye 22 on the left end of the 12LH module. The right end of the pivot pin 24 will, in all cases, be spaced inwardly of the plugged link end or eye 26. A spring plug 28 is then pressed into the central bore of link end 26. The spring plug includes a head, a shank, and a pair of resilient legs terminating in shoulders. The legs and/or the plug head are resilient such that the legs can be deflected. IN the illustrated arrangement the ends of the legs are conical to facilitate insertion of the plug into the aperture in the plugged link end. The spring plug 28 is pressed into the central bore or aperture in the plugged link end 26 until the shoulders of the plug legs are on the inside of the plugged link end and the plug legs spring outwardly to retain the plug in the plugged link eye. With the spring plug housed in the aperture it blocks axial movement of the pin 24 to the right. The left end of the pin 24 is similarly restrained against axial movement by the blind link end 20 or 22.

The fastener arm 26 and spring plug 28 occupy space 32 in the right-hand end of the module in the adjacent row. With this configuration, it will be apparent the right-hand module cannot be reversed end-for-end and assembled into the conveyor. This foolproof assembly concept is carried over to the other modules in the assembly as well. For example, the 6LH module in FIG. 6 and the 12LH module in FIG. 10 are non-reversible. Among other things, the blind link end 20 or 22 would block passage of the pivot pin during assembly of the pivot pin to the conveyor. But over and above that, the link end on the right end of either module would be facing the wrong direction when attempting to make the assembly. The same is true of the 12S and 12LH modules. They can't be reversed end-for-end.

Additionally, the middle link ends of the 6LH or the 6RH module are slightly wider than the other link ends, and the corresponding space between the confronting adjacent link ends of the next module is somewhat wider than the space between the other link ends. For purposes of illustration, these link ends are shown in FIG. 1 as being shaded and the corresponding wider link ends in a properly bricked assembly of the 12" modules are also shown shaded in FIG. 1. It will be noted that the wider link ends all line up as indicated by "S". These (shaded) wide link ends function as keys for proper alignment and assembly of the modules, and if the modules are not properly positioned during assembly, the link ends cannot be meshed. Therefore, workers assembling the conveyor and working from either side can start with a middle module and be assured of a proper alignment. If the modules are not properly aligned they won't fit together. This, coupled with the inability to end-for-end the modules, results in very fast, foolproof assembly still obtaining the benefits of a bricked construction. Additionally, the wide eyes can transmit greater loads, and therefore, the wide eyes can be located in those areas of the modules in alignment with the cavities on the underside of each module where the drive sprockets engage the modules.

Reference has been made to the fact that the bricking, in effect, ties modules in one row together through modules in the adjacent row. For example, the 12LH module in row 1 of FIG. 1 in effect straddles a 6LH module and a 12S module and, therefore, is operative to tie modules 6LH and 12S together. This keeps the entire assembly from drifting apart and keeps the sides of the conveyor smooth.

Figure 2:
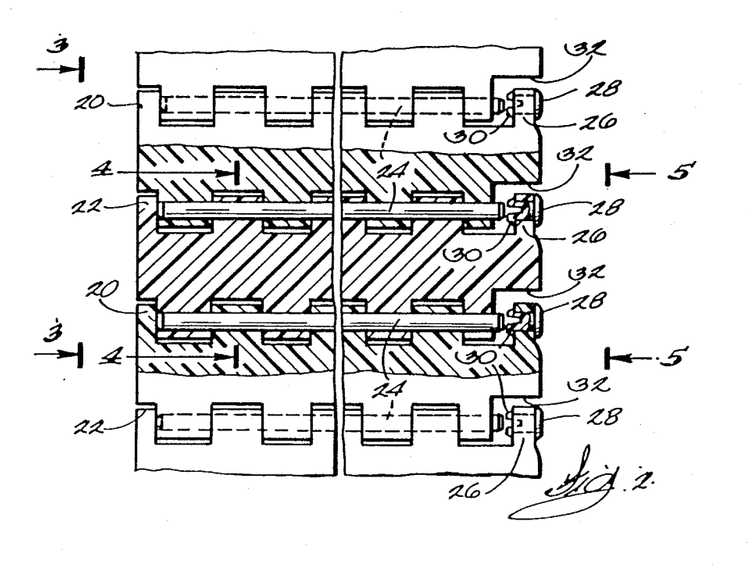
FIG. 2 is an enlarged horizontal section of a portion of the conveyor shown in FIG. 1 and with portions broken out.
Figure 3:
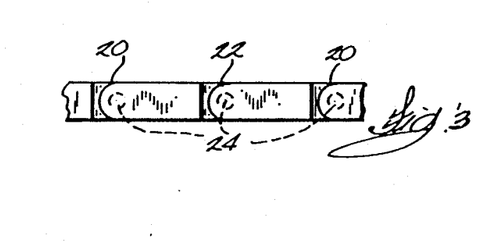
FIG. 3 is an end view taken along line 3—3 in FIG. 2.
Figures 4, 5:
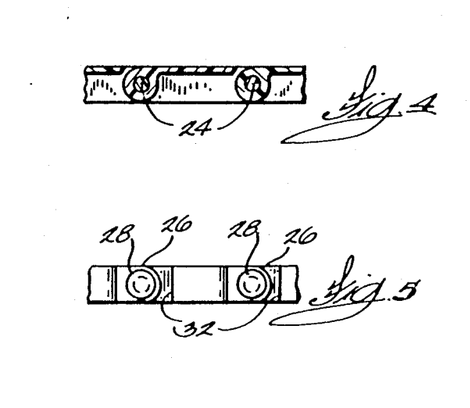
FIG. 4 is a section view taken along line 4—4 in FIG. 2.
FIG. 5 is an elevation view taken along line 5—5 in FIG. 2.

As can be seen in FIGS. 2 and 3, the left edge of the conveyor chain is essentially flush. A comparison of FIG. 2 and FIG. 5 shows that the spring plug ends also lie in substantially the same plane as the right edge of the RH modules. Therefore, the right edge of the conveyor chain is essentially flush, and there are no projections to engage wear plates or the like. This permits two conveyor chains to run side-by-side at the same speed, different speeds or in opposite directions and with no intermediate guides and without undue friction or snagging between the two conveyors.

While for convenience of illustration the modules are shown as having solid upper surfaces, it will be understood that those skilled in the art that appropriate holes may be provided in the top surface of the modules to provide for passage of liquids or air as is customary in mat top conveyor assemblies, and the modules may also be provided with upwardly projecting ribs, the ribs extending parallel to the direction of movement of the conveyor chain or transverse to the direction of movement. The modules are also usually made of plastic which can withstand the head and solutions encountered in operation and in cleaning the conveyor.

Figure 11:
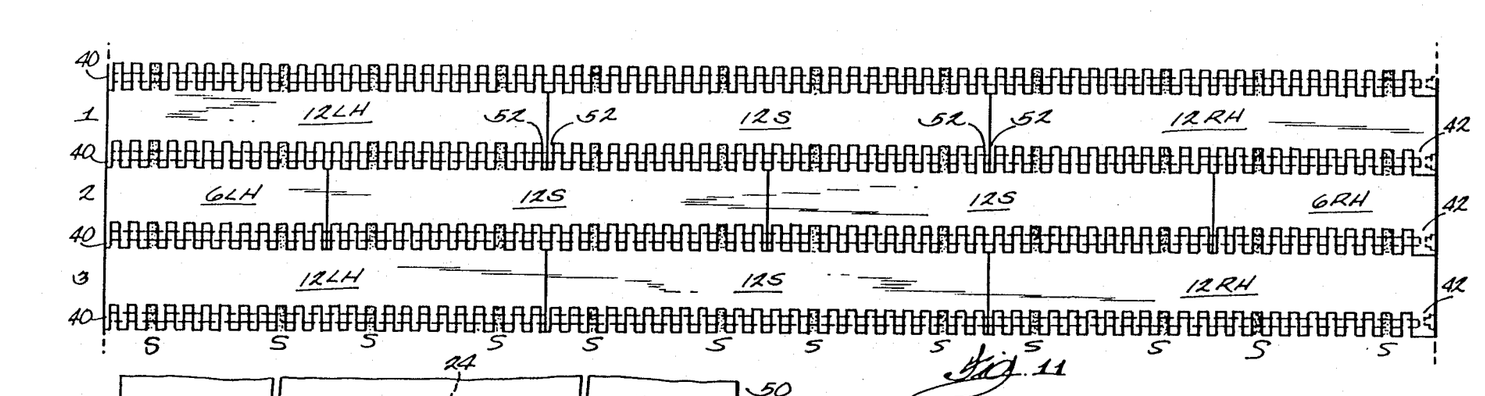
FIG. 11 is a plan view of a conveyor chain assembly comprising a second embodiment of the invention.

Turning now to the second embodiment, FIG. 11 shows a portion of a 36" wide conveyor having a first row made up of three 12" modules. The 12"modules are, left to right; 12LH, 12S and 12RH. In the next row, to get the bricking effect, the left edge module is a 6LH module, followed by two 12S modules and a 6RH module. Row 3 repeats row 1 and row 4 would repeat row 2.

Figure 17:
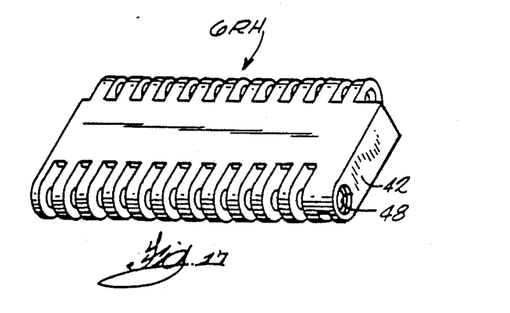
FIG. 17 is a perspective of a 6 inch right side module of the chain embodiment shown in FIGS. 11-15.
Figure 18:
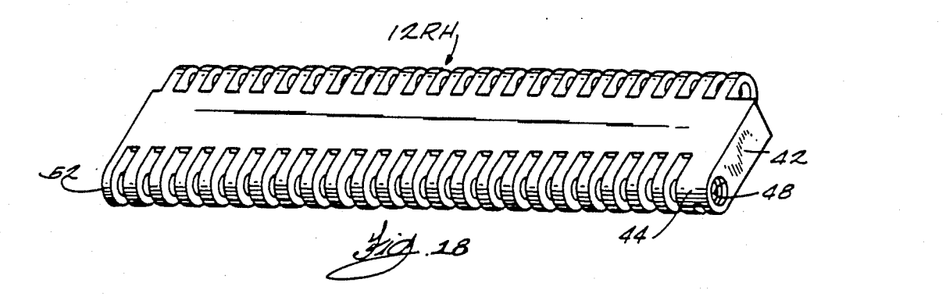
FIG. 18 is a perspective view of a 12 right side module of the chain embodiment shown in FIGS. 11-15.
Figure 19:
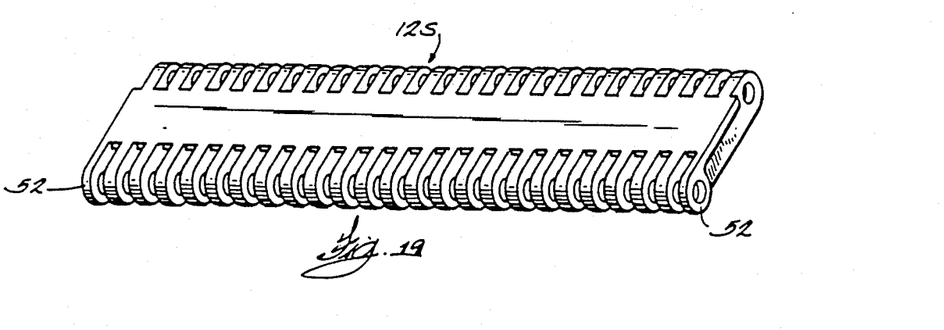
FIG. 19 is a perspective view of a 12 inch standard or middle module of the chain embodiment shown in FIGS. 11-15.
Figure 20:
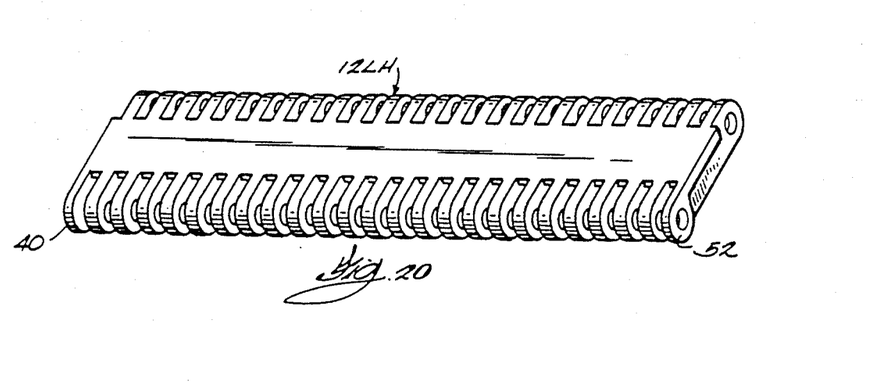
FIG. 20 is a perspective view of a left side 12 inch module of the chain embodiment shown in FIGS. 11-15.

Five different modules are incorporated. Each left edge module, 12LH or 6LH, has a blind link or eye 40 against which the hinge pin 24 will abut when the assembly is completed. Referring to modules 6RH and 12RH (FIGS. 17 and 18), it will be noted that the rearwardly facing arm or link end 42 at the right side of each module is substantially wider than any other link end. On the front of the module at the right side, there is a substantial opening 43 to receive the adjacent rearwardly extending link end 42. These modules cannot be reversed end-for-end during assembly of the conveyor chain.

Figures 11, 12:
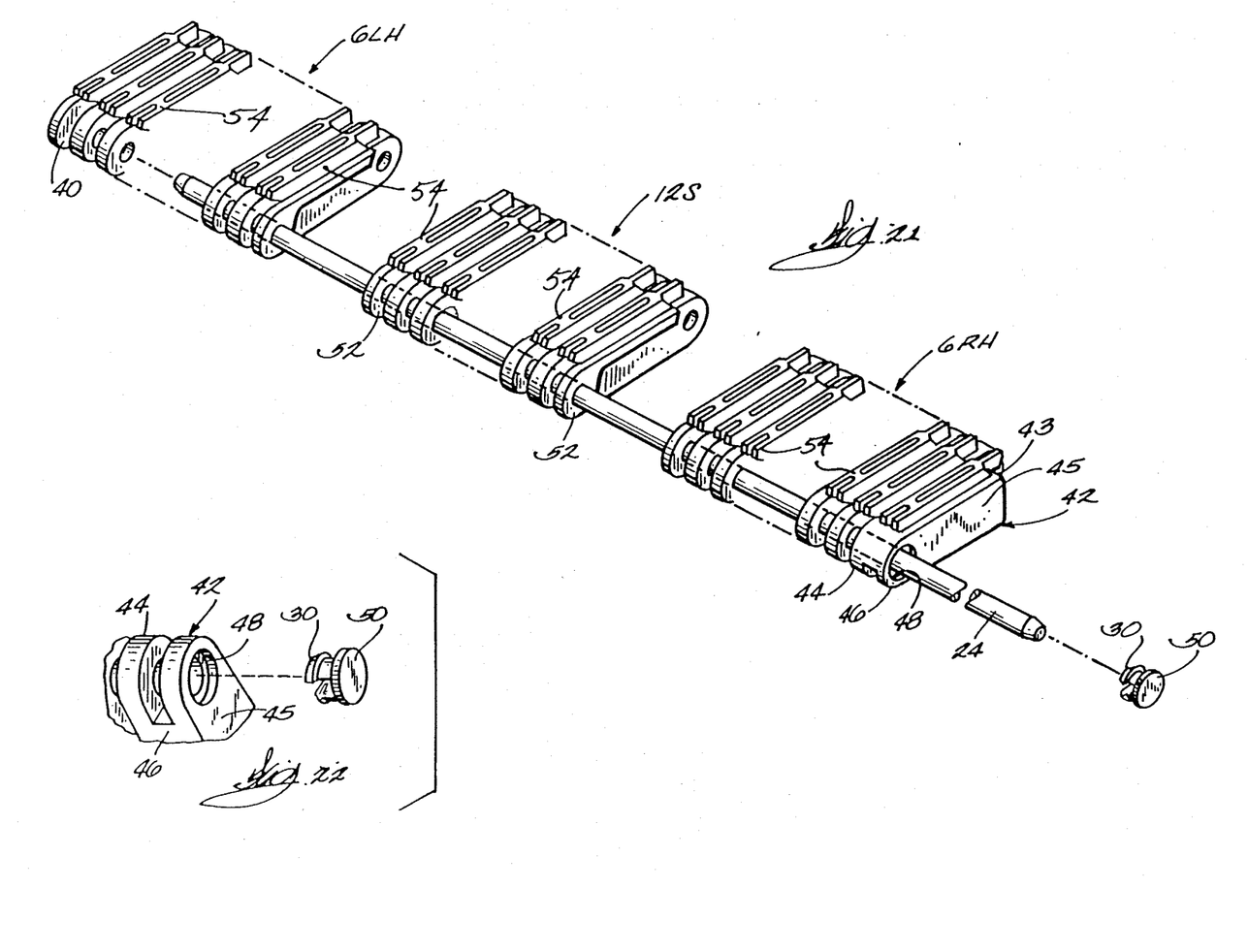
FIG. 12 is an enlarged view similar to FIG. 2 and shows details of the conveyor chain assembly shown in FIG. 11.
Figure 12:
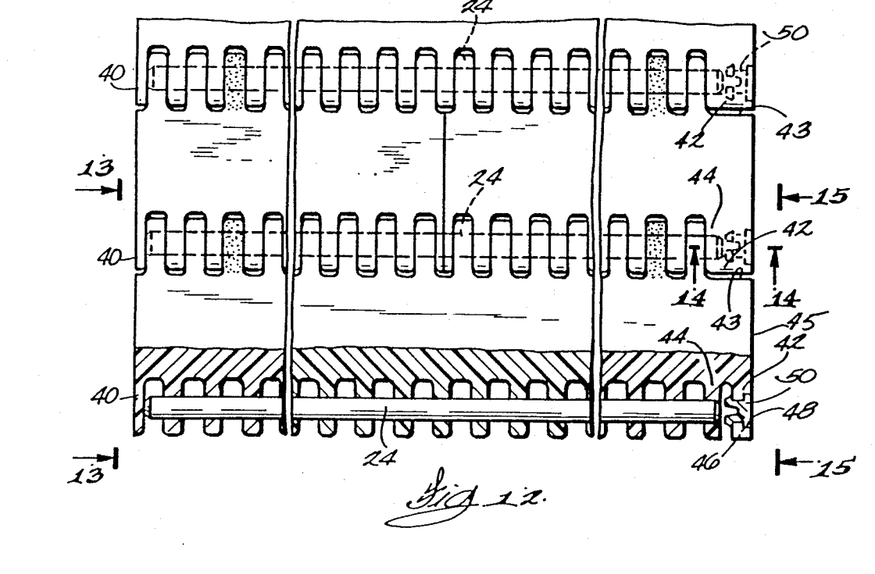
Figures 13, 14, 15:
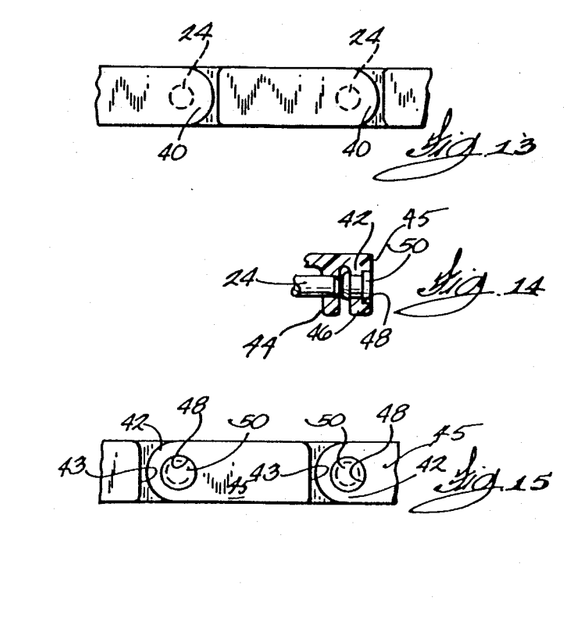
FIG. 13 is a view taken along line 13—13 in FIG. 12.
FIG. 14 is a view taken along line 14—14 in FIG. 12.
FIG. 15 is a view taken along line 15—15 in FIG. 12.
Figure 16:
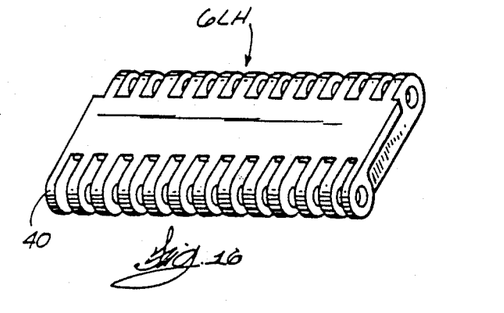
FIG. 16 is a perspective view of a 6 inch left side module of the chain embodiment shown in FIGS. 11-15.

In FIG. 12 it will be noted that the rearwardly extending link end or arm 42 incorporates a more-or-less standard link end 44 on the inside of the link end or arm 42. The pivot pin 24 runs through the link end 44 and the meshing link ends to abut the blind eye 40 at the left side of the conveyor. The outer surface 45 of the enlarged end 42 has a countersunk hole 48 to receive the head of a spring plug 50 which is pressed into the aperture in link end or arm 46. In the illustrated arrangement the spring plug 50 has a configuration substantially the same as plug 26 referred to above. The inner end of the plug 50 lies close to the pivot pin 24 to prevent axial movement of the pin. The head of the plug 50 substantially fills the countersunk hole and lies flush with the outer surface of the enlarged end 42 so as to present a smooth or flush surface minimizing the chance for snagging or contamination.

In FIGS. 11 and 12 the "wide ends" are shaded to indicate the location of the slightly wide ends (again indicated by "S"). The sprocket drive cavities in the underside of each module line up with the wide eyes as with the first embodiment. It will be appreciated that in order to find a "repeat" of the layout a module would have to be 6" out of position to permit assembly of the wide ends into the adjacent modules. The unlike link ends serve a useful purpose in preventing misassembly of the module and thereby speed up assembly of the conveyor chain. The modules can't be interchanged. For example, in row 1 the 12LH and 12S modules each have a half link end 52 projecting into the space between link ends in the 12S module in row 2. If the 12S module, for example, were to be reversed, that half link end 52 would abut the blind link end 40 projecting from the row ahead of row 1.

In the embodiment of FIG. 21, the modules are provided with raised ribs 54 for supporting various products as well known in the art. The ribs of one module may or may not overlap ribs of the next leading or next trailing module. The separation between the ribs is adequate to permit removal of product from the conveyor by means of a comb-type transfer plate. The usual perforations are incorporated in the surface of the module for liquid drainage and passage of air.

It will be appreciated that the illustrated modules can be assembled to make a bricked 24" wide conveyor. Thus, that version would utilize 6LH, 12S and 6RH modules as in FIG. 21 followed by a 12LH and a 12RH module. The next row would then be a repeat of the first. Eighteen inch and 30" conveyors can also be bricked with these parts. In every assembly, the joints between modules in a given row are always straddled by a single module in the adjacent row (whether forward or back on the conveyor) and the module which straddles the joint acts to hold the modules together horizontally.

Figure 23:
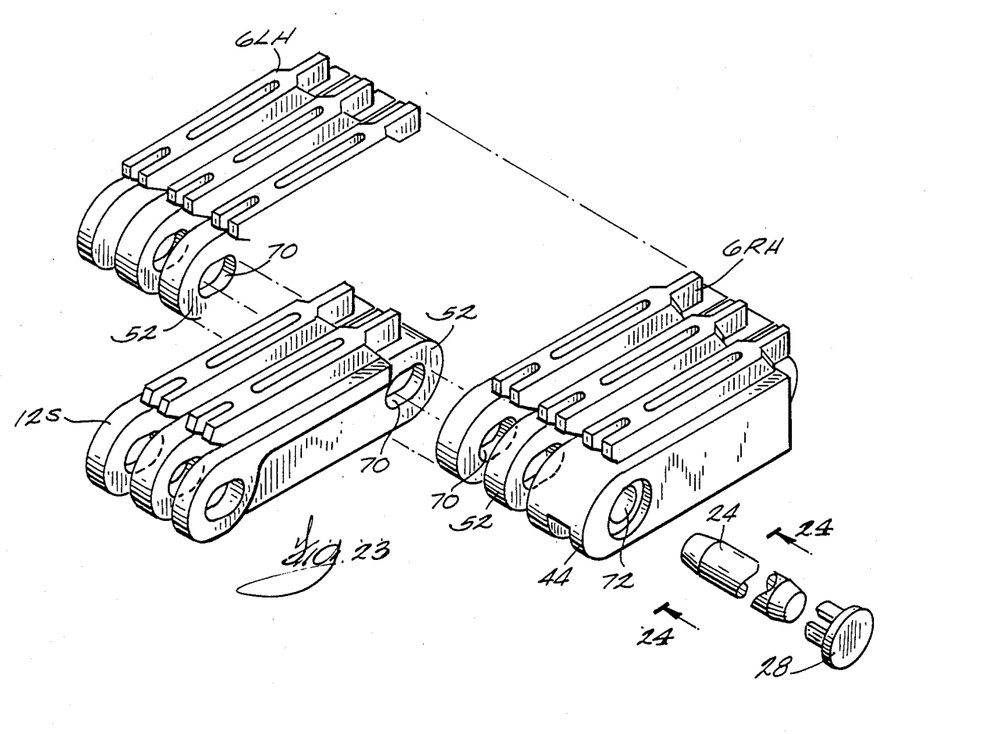
FIG. 23 is a partial exploded view similar to FIG. 21 and showing a plurality of modules of an alternative embodiment of the invention joined together by a hinge pin.
Figure 24:
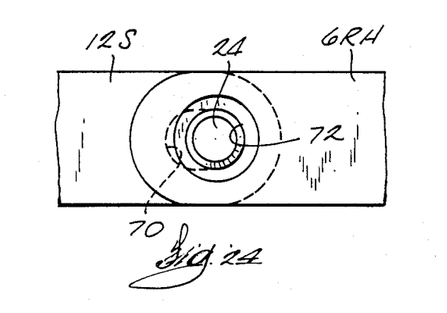
FIG. 24 is an enlarged view taken along line 24—24 in FIG. 23 and showing the modules of the chain assembly positioned to permit insertion of a hinge pin.
Figure 25:
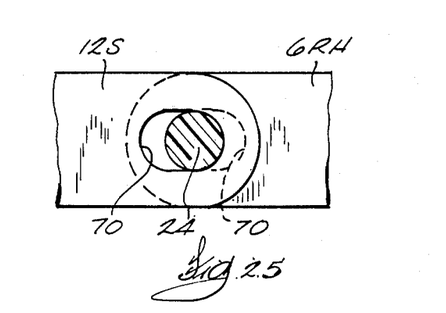
FIG. 25 is a cross section view similar to FIG. 24 and showing the modules of the chain assembly under tension.

FIG. 23 illustrates another alternative embodiment of the invention wherein two rows of modules are joined together by a hinge pin 24. In the embodiment shown in FIG. 23, the modules each include link ends 52 having oval shaped apertures or slots 70 for housing the hinge pin 24. The oval apertures 70 are elongated in the direction of movement of the chain and permit limited relative movement of joined module 12S with respect to modules 6LH and 6RH in the direction of movement of the chain. As best shown in FIG. 24 the link end 44, adapted to house the plug 28, includes a circular hole 72. The remainder of the apertures in the link ends 52 of the modules 6RH are oval, and the circular hole 72 is aligned with the inner ends of the slots 70 of module 6RH.

Figure 26:
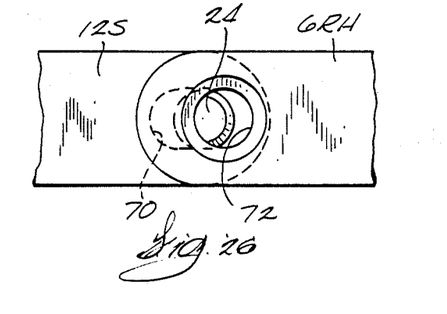
FIG. 26 is a view similar to FIG. 24 and showing a hinge pin joining adjacent modules and with the modules under tension.

During assembly of the modules, two rows of modules are placed together with the link ends 52 of adjacent modules intermeshing and with the slots 70 in alignment as shown in FIG. 24 such that the hinge pin 24 can be inserted through the hole 72, through the aligned slots 70, into the link ends 52. When the chain is put in operation, the modules are then placed under tension as shown in FIG. 26 and the hinge pin 24 is pulled to a position where it is out of alignment with the hole 72 such that even if the plug 28 is dislodged from the hole 72, the hinge pin 24 cannot not move axially out of the module through the hole 72. The off-center positioning of the hole 72 with respect to a line extending through the center of each of the slots 70 of the link ends 72 of the modules forming a row thus provides a redundant means for maintaining the hinge pin 24 in the modules and restricts removal of the hinge pin from the modules.

Another advantage of the embodiment of the invention shown in FIGS. 23-26 is that the slots 70 facilitate cleaning of the chain modules. In some applications of the conveyor chain embodying the invention, it may be used in food handling or processing or in commercial applications where cleaning of the chain and hinge pins is required. The provision of slots for housing the hinge pin permits entry of cleaning solution around the hinge pins and effective cleaning of the hinge joint between modules.

Various features of the invention are set forth in the following claims.

I claim:

1. A chain module for use in forming a conveyor chain assembly and the chain module comprising a body portion including opposite lateral ends, a plurality of link ends projecting forwardly and rearwardly from the module body portion with respect to the direction of movement of the conveyor chain, the plurality of link ends being adapted to intermesh with link ends of an adjacent module, at least a plurality of link ends including substantially coaxially aligned holes adapted to house a hinge pin for pivotally joining together adjacent modules, said coaxially aligned holes in said plurality of link ends being slots having a length extending in the direction of movement of the conveyor chain, each of said slots including opposite ends, one of said ends of each slot being adjacent the module body portion and the other end of each slot being spaced from the module body portion, and one of said link ends projecting from the module body portion adjacent one of the lateral ends of the body portion having a generally circular aperture and being adapted to permit insertion of a hinge pin through the link ends to join together a pair of modules, said generally circular aperture being aligned with said one of said ends of said slot.

2. A conveyor chain assembly comprising a multiplicity of rows of chain modules defining a conveyor surface, the conveyor surface having opposite edges, each chain module having opposite ends and a plurality of link ends projecting forwardly and rearwardly from the chain module with respect to the direction of movement of the conveyor chain, and the link ends of each chain module intermeshing with link ends of the chain modules in the adjacent row, at least a plurality of said link ends including substantially coaxially aligned holes adapted to house a hinge pin for pivotally joining together adjacent modules, said coaxially aligned holes in said plurality of link ends being slots having a length extending in the direction of movement of the conveyor chain, each of said slots including opposite ends, one of said ends of each slot being adjacent the module body portion, a pivot pin passing through the aligned holes in intermeshing link ends and between the rows, the pivot pin having opposite ends and being generally circular in cross section, and the pivot pin being slideably movable in the slots in the link ends from a position wherein the pivot pin is housed in said one of said ends of each slot when the modules are under compression with respect to the direction of movement of the conveyor chain and a position wherein said pivot pin is housed in the other end of said slots in the module link ends when the chain modules are under tension with respect to the direction of movement of the conveyor chain, one of he chain modules forming one of the opposite edges having a solid link end, the solid link end including a surface portion positioned in opposed facing relation with respect to one end of the pivot pin and adapted to engage the one end of the pivot pin to prevent movement of the pivot pin out of the intermeshing link ends, the modules forming the other end of each row having an end including a plugged link end, said plugged link end having opposite sides and a circular hole therethrough in alignment with said one of said ends of said slot, and a spring action plug mounted in said hole in said plugged link end to prevent axial movement of said pivot pin and retain said pivot pin in its operative position.

* * * * *